(No Model.) 7 Sheets—Sheet 1.

J. H. PENDLETON.
GRIP MECHANISM FOR CABLE RAILWAYS.

No. 436,103. Patented Sept. 9, 1890.

(No Model.) 7 Sheets—Sheet 2.

J. H. PENDLETON.
GRIP MECHANISM FOR CABLE RAILWAYS.

No. 436,103. Patented Sept. 9, 1890.

(No Model.) 7 Sheets—Sheet 3.

J. H. PENDLETON.
GRIP MECHANISM FOR CABLE RAILWAYS.

No. 436,103. Patented Sept. 9, 1890.

Fig. 3.

Witnesses
Chas H. Smith
J. Staib

Inventor
John H. Pendleton
per Lemuel W. Serrell
atty (No Model.) 7 Sheets—Sheet 4.

J. H. PENDLETON.
GRIP MECHANISM FOR CABLE RAILWAYS.

No. 436,103. Patented Sept. 9, 1890.

Fig. 4.

Witnesses
Chas. H. Smith
J. Staib

Inventor
John H. Pendleton
per Lemuel W. Serrell
atty.

(No Model.) 7 Sheets—Sheet 5.

J. H. PENDLETON.
GRIP MECHANISM FOR CABLE RAILWAYS.

No. 436,103. Patented Sept. 9, 1890.

Witnesses
Chas. H. Smith
J. Staib

Inventor
John H. Pendleton.
for Lemuel W. Serrell
Atty

(No Model.) 7 Sheets—Sheet 7.

J. H. PENDLETON.
GRIP MECHANISM FOR CABLE RAILWAYS.

No. 436,103. Patented Sept. 9, 1890.

Witnesses
Chas H. Smith
J. Staib

Inventor
John H. Pendleton
per Lemuel W. Serrell
atty.

UNITED STATES PATENT OFFICE.

JOHN H. PENDLETON, OF BROOKLYN, ASSIGNOR TO THE RAPID TRANSIT CABLE COMPANY, OF NEW YORK, N. Y.

GRIP MECHANISM FOR CABLE RAILWAYS.

SPECIFICATION forming part of Letters Patent No. 436,103, dated September 9, 1890.

Application filed March 18, 1890. Serial No. 344,325. (No model.)

*To all whom it may concern:*

Be it known that I, JOHN H. PENDLETON, a citizen of the United States, residing at the city of Brooklyn, county of Kings, and State of New York, have invented an Improvement in Grip Mechanism for Cable Railways, of which the following is a specification.

This invention is adapted to cable railways in which two cables are made use of. Before my invention two cables had been employed traveling at either the same or different speeds, and a mechanism had been invented for grasping either cable; but in consequence of such mechanism having two gripping devices considerable space was occupied in the trench by said two gripping devices.

My improvements as distinguished from the devices heretofore existing relate, first, to a peculiar single gripping mechanism that is easily adapted to gripping the cable; second, to devices for moving the grip bodily into position for grasping one cable or the other; third, to a peculiar central frame-work adapted to being supported beneath the slot in the road-bed and to receive the cable that is gripped at either one side or the other of the central frame-work; fourth, to vertically moving and balanced mechanism by which the grip can be raised or lowered according to the height required for the cable in the trench of the road-bed; and fifth, to mechanism for lowering the grip mechanism to seize the cable and for raising the grip mechanism bodily to the desired height for clearing the stationary sheaves and cable-wheels of the roadway.

Figure 2:
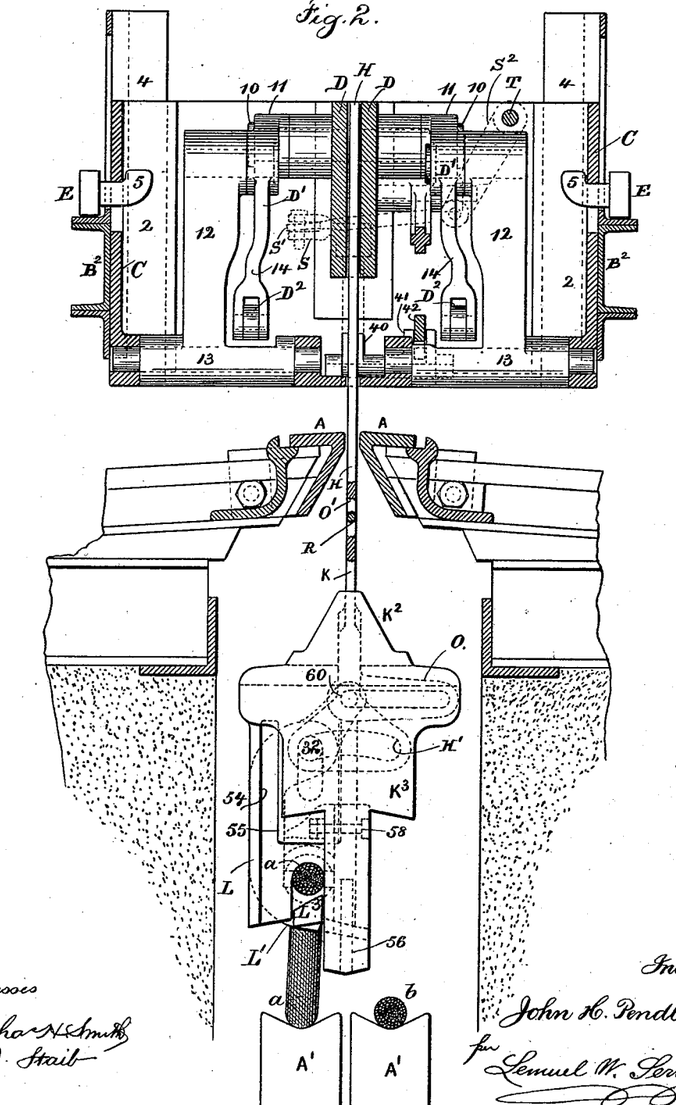
Fig. 2 is a transverse section in larger size of part of the trench and of the frame-work on the car and an end elevation of the grip.
Figure 5:
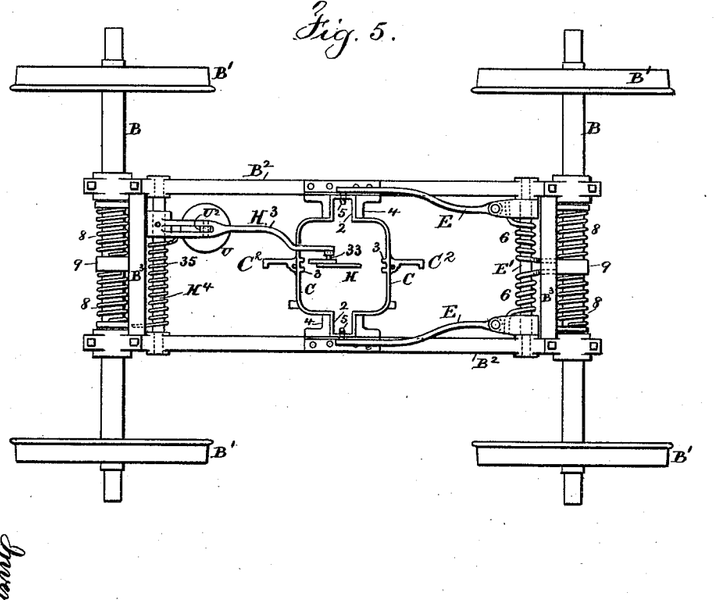
Fig. 5 is a diagram representing the car wheels and axles and the frame supported by the same and the balancing devices.

A A, Fig. 2, represent the slot-rails of the trench; A', the supporting-pulleys for the cables $a\,b$. These parts are of any desired character. The axles B of the car-wheels B' are connected by the side frames $B^2$ and cross-frames $B^3$, which frames carry the parts of the grip mechanism, and there is a vertical quadrangular box C, open at top and partially open at the bottom and having slides 2 2, that move in stationary guides 4 upon the side frames $B^2$, and there are also vertical ribs 3, forming slides that are in the vertical central plane of the grip mechanism, and the main cross-head D is adapted to slide up and down upon these ribs 3 and within the box C. This box C can move vertically in its guides 4 and all the parts that are carried by it, and there are side levers E, having hooked ends 5 passing through vertical slots in the stationary guide-slides 4 and hooking into the box C, (see Figs. 2 and 5,) and these levers E extend to the cross-shaft E' between the side frames $B^2$, around which cross-shaft are helical springs 6, the power of which, that is exerted upon the levers E, is sufficient to counterpoise the weight of the grip mechanism, or nearly so. The springs 6, illustrated in Fig. 5, may be of any desired character and applied in any convenient manner as a counterpoise to the box C and grip mechanism or weights, or any desired counterpoise may be employed.

The side frames $B^2$ are provided with eyes or boxes, through which pass the axles B, and there are springs 8 between the side frames $B^2$ and the central collars 9 in order that the frames $B^2\,B^3$ may slide endwise of the axles slightly, should it become necessary in passing around the curved track, for preventing the plates that pass down between the slot-rails A A binding against such slot-rails. The springs 8 return the parts to their normal positions upon the straight track.

The main cross-head D is allowed to slide vertically within the box C, for a purpose hereinafter designated, and in order to give this sliding motion I make use of the cranks D′ upon the pivots 10, that project at the respective sides of the main cross-head D. Each crank has a short arm 11, pivoted at its outer end to the radius-bar 12, the latter being hinged at its lower end to the inside bottom portion of the box C by the joints 13, and the long arm 14 of each crank D′ is connected to one end of the yoke D², the side bars of the yoke being parallel and passing through slots in the box and the guides 15, and there is a rod D³ connected with the yoke at its end and passing to the lever 16 at one end of the car, and from the upper end of this lever 16 a rod D⁴ passes to the lever 17 at the other end of the car, and from the lower end of this lever 17 a rod D⁵ passes to the lever 20, connected with the box C and serving to move the pawls hereinafter described.

Figure 1:
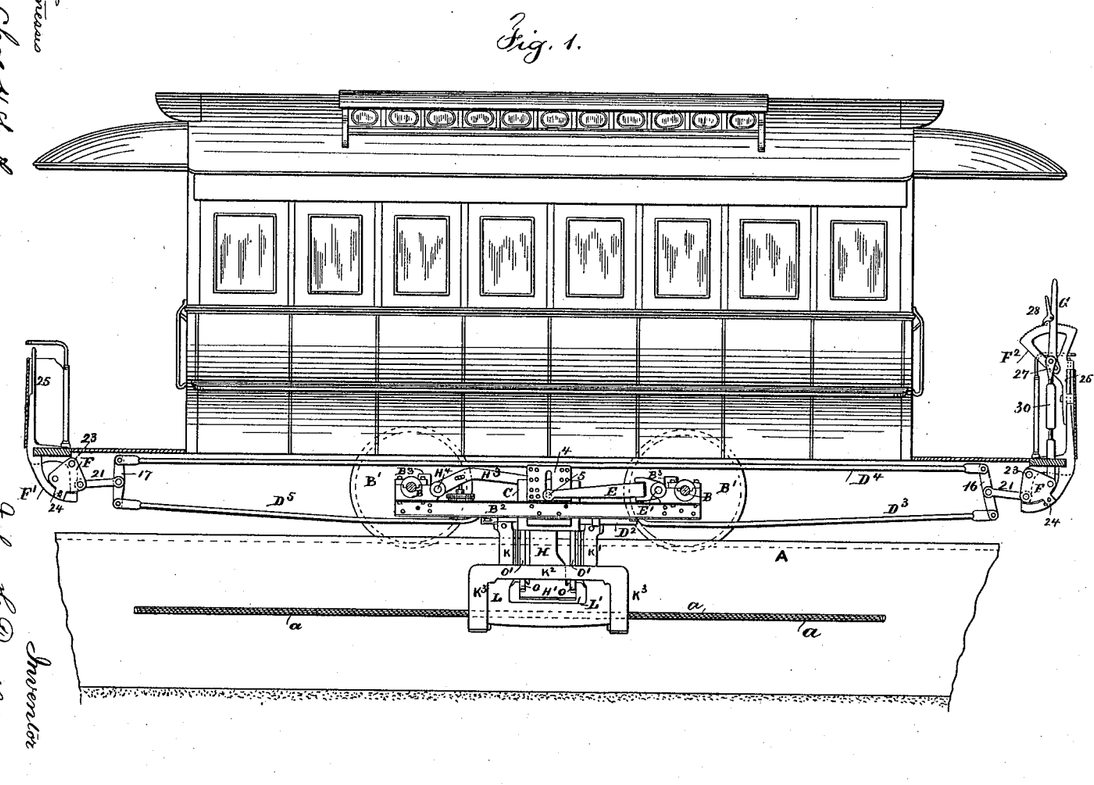
Figure 1 is an elevation of the car with the grip mechanism connected thereto, the trench being in section.

The levers 16 and 17 are pivoted in their centers to links 21, that extend to the rockers F, that are pivoted at 23 upon the under side of the car-platforms, and upon each rocker is a projection 24, with a hole adapted to receive a pin, as shown at the left-hand end of the car, Fig. 1, which pin passes into a segmental support F′, that is fastened onto the car and extends up above the platform and terminates as a straight rod 25, and a movable frame F² is provided with two ears perforated to set over the straight rod 25, and the upper part of this frame is sector-shaped and receives the handle G, pivoted at 27 and provided with a latch 28, and there is a turn-buckle rod 30 extending from the handle G down to an eye or hole in the rocker F, there being a pin upon the turn-buckle rod to enter such hole in the rocker. It is always preferable for the driver to stand upon the advancing end of the car and for the entire grip mechanism to be under his control. It is therefore preferable for the sector-frame F², handle G, and turn-buckle rod to be carried from one end of the car to the other, and the pin upon the lower end of the turn-buckle rod is to be connected to the rocker F at that end of the car and the rocker loosened by pulling out the pin in the projection 24 and inserting that pin in the rocker at the other end of the car to permanently connect such rocker with the segmental support F′.

It will now be apparent that the lever-handle G can be moved backward and forward, and in so doing the rocker F that is connected with it will be swung and the rods D³ D⁴ D⁵ moved either one way or the other by the lever and connecting-link to the rocker, and when the lever 16 is moved by the rocker bodily toward the front of the car the rod D³ will be drawn upon, the yoke D² will also be drawn forward, and in so doing the cranks D′ will be swung and the short arms 11 of the cranks and the radius-bars 12 will act as toggle-joints to elevate the main cross-head D, or if the movement of the rocker and handle are in the opposite direction the cranks D′ will depress the main cross-head, such cross-head and the parts carried by it being thus bodily moved up or down, and in consequence of the levers 16 and 17 being connected by the rod D⁴ the rods D³ and D⁵ will be moved simultaneously and in opposite directions, and the parts are so proportioned that the necessary end movement can be given to the rods D³ and D⁵ toward each other or away from each other by the handle G, and, no matter at which end of the car the movable sector-frame F² and handle G may be applied, the same movement of the handle at either end will draw the bars D³ and D⁵ away from each other, and the reverse movement will press them toward each other, and the pawl or latch 28, engaging the tooth-sector, will hold the lever-handle G in any position where it may be placed. These points are to be borne in mind, especially because it will be hereinafter shown that by the movements of the lever-handle G the entire grip mechanism is raised or lowered or either one cable or the other raised or dropped or clamped or loosened.

Passing vertically through the cross-head D is the rack-plate H, which plate passes down through the slot between the rails A to the grip mechanism, and it terminates at the lower end as a head H′, having a transverse segmental slot for the pin 32 of the grip mechanism, and at one side of the cross-head D is a vertical slot, (shown by dotted lines in Fig. 3,) and there is a pin 33 fastened upon this rack-plate H and extending out through that vertical slot, and at the end of the lever H³ is a hook 34, that hooks under this pin 33, and the lever H³ passes to a cross-shaft H⁴ between the side frames B², and there is a spring 35 around this shaft H⁴, that acts as a partial counterpoise through the lever H³ upon the rack-plate H and the parts connected with the same to tend to lift the said rack-plate H to the desired extent and thus lessen the strain upon the mechanism that is made use of in lifting said rack-plate H. These parts are represented in the diagram Fig. 5, and, as the box C rises or descends bodily as the grip mechanism follows the cable and any elevating or depressing devices in the trench, the lever H³ moves with the rack-plate and the box.

One edge of the rack-plate H is provided with teeth, and there is a pawl 40 pivoted upon the bottom of the box C and having a crank-arm 41 and link 42 to the lever 43, that is pivoted at 44, and the upper end of this lever 43 is connected by a link 45 to a stud 46, that passes through a slightly-inclined slot in the cross-head D (see Figs. 3 and 4) and is permanently fastened to a rack-clutch I, which is within the cross-head D and adjacent to the teeth on the rack-plate H, and there is room enough within the mortise of the cross-head that is occupied by this clutch for such clutch to be slid toward and from the teeth of the rack-plate H, and the pins 46 and 96 in the slotted holes in in the cross-head D serve as guides for this clutch I.

Figure 8:
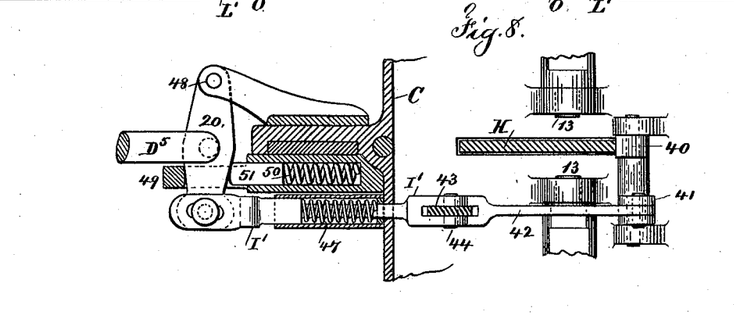
Fig. 8 is a sectional plan view at the line $z\,z$, Fig. 3.

The pivot 44 of the lever 43 is at the end of the slide-rod I', around which is a spring 47, (see Fig. 8,) and there is a slotted connection between the end of the slide-rod I' and the lever 20, before referred to. This lever 20 is pivoted at 48 upon an arm connected to the box C, and there is around the lever 20 a loop 49, within which is a hole containing a spring 50 and a plug 51. By this construction it will be understood that the loop 49 limits the motion of the rod $D^5$ and lever 20 in an outward direction, and the spring 50 and plug 51 prevent the lever 20 and rod $D^5$ moving toward the box C until the force exerted is sufficient to overcome the spring 50 of the plug 51. It will also be apparent that the spring 47 is the spring for the pawl 40, because this spring 47 acts through the slide-rod I', lever 43, and link 42, and the slotted connection between the slide-rod I' and the lever 20 allows the pawl 40 to be swung by the spring; but when the pressure upon the rod $D^5$ is sufficient to overcome the spring 50 and the spring 47 the slide-rod l' is forced inwardly of the box C, and the lever 43 acts through the link 42 to throw back the pawl 40, and also by the link 45 to move the clutch I, and when this has been done the rack-plate H and parts connected therewith, being unsupported, drop; but the amount of motion allowed for by the pin 33 in the slot in the cross-head D is not sufficient to allow the highest tooth on the rack-plate H to pass below the bottom tooth of the clutch I. Hence by moving the handle G backward and forward, as before described, and pressing the rod $D^3$ toward the box C the leverage of the compound crank lever and toggle D' and radius-bars 12 is sufficient to raise the cross-head D up and down several times, and at each lift of the cross-head the rack-plate H is lifted, and the pawl 40, taking the teeth of the rack-plate H in succession, retains such rack-plate as lifted, and as the cross-head D descends and carries with it the clutch the inclined teeth on the clutch I cause the same to move away from the teeth of the rack-bar, and on the reverse motion the clutch-teeth engage the rack-plate, and it is lifted by the clutch, and the movements are continued until the parts are restored to their normal position, the spring 47 acting upon the pawl 40 and upon the clutch to bring the parts toward the rack-plate and allow the pawl to move backwardly in the upward movement of the cross-head and rack-plate and the clutch to move backwardly on the downward movement given to the cross-head, the object of these movements being, first, to drop the rack-plate H and parts connected therewith for the purpose of passing the grip-hook below the cable, and, second, to draw up the cable by working the lever G backward and forward until the parts are restored to their normal position, (shown in Fig. 3,) and, third, to grip the cable. There is a distance between the upper end of the pawl 40 and the first tooth upon the rack-plate H, in order that the cross-head D and rack-plate H may be allowed to go up or down together to a certain extent within the box C, for a purpose hereinafter named.

Extending out at front and rear of the box C are flanges $C^2$, cast with or attached to the box, and to which are bolted the vertical end plates K K', that pass down through the slot between the rails A A, and they are connected to the top piece $K^2$ and end pieces $K^3$ of the grip-frame, and between these end pieces $K^3$ is the grip-block L, which is grooved upon its under side for the reception of the cable, and there is a central opening at the upper part of this grip-block, into which are received the ends of the grip-hook L', and this grip-hook L' has end pieces at the top, between which is received the slotted head H' of the rack-plate H, before named, and the pin 32, that passes through this slotted head, passes through the end portions of the grip-hook L' and forms a pivot upon which such grip-hook swings, and the ends of this pin 32 pass into vertical slots in the end portions of the grip-block L, and there are springs within recesses in the grip-block L, that bear upon the end portions of the pin 32, such end portions being either flattened or spread out for the helical springs to act upon. One of these springs 53 is shown in Fig. 10, and in Fig. 3 the recess for the reception of such springs 53 at the ends of the pin 32 is represented by dotted lines.

Figure 12:
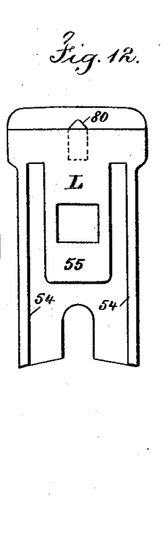
Fig. 12 is an end view of the sliding head-block detached.

Each end of the grip-block L is made in the form represented in Fig. 12—that is to say, there are edge flanges 54 and a central block 55, and upon the end pieces $K^3$ there are projecting flanges 56 of a width adapted to pass into the slots between the edge flanges 54 and central block 55.

Figure 9:
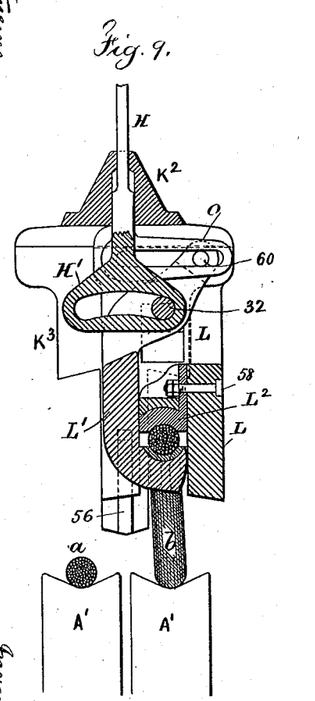
Fig. 9 is a vertical section at the line $z'\,z'$, Fig. 3.
Figure 10:
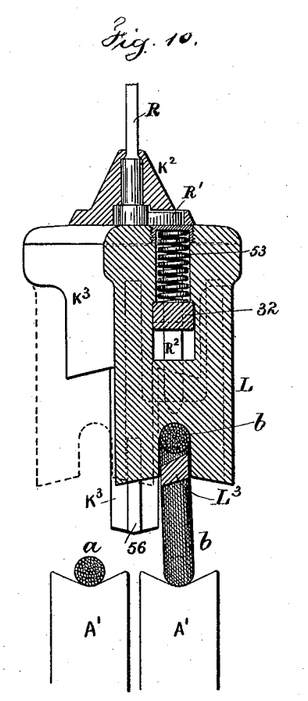
Fig. 10 is a vertical section near the line 1 1, Fig. 3.

Upon reference to Figs. 3, 9, 10, and 12 it will be apparent that the grip-block L can be moved bodily and transversely between the end pieces $K^3$ when the blocks 55 at the ends of the grip-block are above the flanges 56, and that this grip-block L can be raised or lowered bodily when it is in the position represented by full lines in Fig. 10 or by the dotted lines, the object of this movement being to allow the grip-block L and grip-hook to be moved vertically a sufficient distance to act upon either one of the cables; but the grip cannot be moved bodily and transversely between the end pieces $K^3$, except when the blocks 55 are above the flanges 56, and bearing this feature in mind it is to be understood that if the grip mechanism has hold of the cable b, as seen in Fig. 9, the grip-hook L' may be lowered slightly, (sufficient to allow the cable to continue its movement while the car stands still,) the cable traveling upon the grooved upper surface of the grip-hook and between the same and a wearing-block or jaw-plate $L^2$, Fig. 9, that is fastened upon the inner side of the grip-block in a recess provided for it by bolts 58, and if the grip-hook L' is swung upon the pivot-pin 32 the cable $b$ can be dropped, and if it is desired to pick up the cable $b$ again the grip-block and grip-hook are lowered bodily and the grip-hook is swung back beneath the cable $b$ and the parts raised up bodily by lifting the rack-plate H and connected parts, after which sufficient pressure is applied to grip the cable; but if the cable $a$ is to be picked up the grip-block is moved bodily and transversely into the position indicated by dotted lines in Fig. 10 by means hereinafter described. In either instance the edge flanges 54 limit the lateral movement of the grip-block by coming against the flanges 56, and then the grip-block and grip-hook are lowered until the grip-hook passes below the cable $a$, and it is swung in beneath it and the parts are raised the same as before described, and the cable $a$ gripped between the hook and the wearing-jaw $L^2$, so that by this construction I am able to make use of only one gripping mechanism and to grip either one cable or the other after simply moving the gripping mechanism transversely within the grip-frame.

Figures 6, 13:
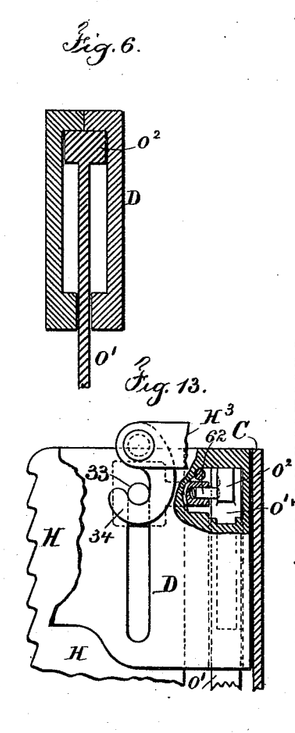
Fig. 6 is a vertical section at the line $x\,x$, Fig. 3.
Fig. 13 is a sectional elevation of a portion of the cross-head and connected parts.

Having described the means for raising and lowering the grip-block and grip bodily, I will next describe the means for swinging the grip-hook to open and close the same. The end portions of the grip-hook are extended above the pivot-pin 32 in the form of arms having pins 60, projecting toward each other and passing into the horizontal slots of the hook-swingers O O, that are at the ends of the vertical rods O', that pass up through the bottom of the box C and into the end portions of the cross-head D. These rods O' have T-heads, and the cross-head D is recessed for such T-heads, as seen in Fig. 6. These T-heads on the vertical rods O' prevent the rods dropping away from the main cross-head D when the parts are lowered by dropping the rack-plate H, as before described; but when the parts are in their normal position (illustrated in Fig. 3) the cable which is between the hook L' and the jaw $L^2$ can be gripped more or less tightly by raising or lowering the main cross-head D, because in so doing the rack-plate H and head H' raise and lower the pin 32 and lift the hook L' bodily against the lower side of the cable, and if the cross-head D is lowered slightly the springs 53, acting between the pin 32 and the grip-block L, keep the grip-block L up against the under side of the top piece $K^2$, while the pin 32 and the hook L' descend sufficiently to loosen the hold of the grip-hook L' upon the cable.

If the grip-block L and grip-hook L' are lowered by the downward movement of the head-block D, the rack-plate H is caught by its first tooth coming in contact with the pawl 40, and the pin 33 remains in a fixed position, while the further downward movement of the head-block D by the action of the crank D' causes the vertical rods O' to move down, and the hook-swingers O, pressing upon the pins 60, swing the grip-hook L' away from beneath the cable, so that the cable can be dropped, and if it is desired to pick up the cable the further endwise pressure upon the rod $D^3$ swings the crank D' until the bottom edge of the cross-head D rests upon the bottom of the box C, and the movement of the rod $D^3$ is now arrested, and the further pressure against the lever G, acting through the lever 16, rod $D^4$, lever 17, and rod $D^5$, causes the rack-plate H to be unlatched both at the pawl 40 and the clutch I, as before described, and the whole of the parts of the grip descend until the movement of the grip-block L is arrested by the flange 56, and the first upward movement given to the cross-head D, as before described, lifts upon the rods O' by their heads and swings the grip-hook L' in beneath the cable, and the lifting movement is continued, as before described, until the parts are brought up to their normal position, after which the cable is gripped by the slight movement given to the cross-head D after the grip-block L has come into contact with the top piece $K^2$ of the grip-frame, and it will be understood that the latch 28 on the handle G will hold the parts in position after the pressure necessary for gripping the cable has been applied. These parts, as described, operate the same whether one cable or the other cable is being acted upon. It is therefore now only necessary to describe the devices for moving the grip-block and parts carried by it bodily and transversely within the grip-frame; but it is to be borne in mind that before the second cable can be gripped the parts have to be disconnected from the first cable, as before described, and then raised up without any cable nearly into the positions shown in Figs. 9 and 10, in order that the grip-block and its parts may be moved laterally and into the position indicated by dotted lines in Fig. 10.

In Fig. 13 a part of the cross-head is shown as broken open to represent the top part of the rack-plate H, and it also shows the T-head $O^2$ on one of the vertical rods O', and upon the rack-plate H there is the plate carrying the pin 33 for the hook 34 of the lever $H^3$, and there is a pin 62 in a hole in the base-plate of the pin 33, the conical end of which pin 62 is pressed outwardly by a spring into one of two recesses in the T-head $O^2$ to give a sufficient connection between the rack-plate H and the rod O' to cause the latter to move with the former until the pawl 40 takes the first tooth in rack-plate H, after which the closed top part of the cross-head D above the head $O^2$ presses down $O^2$ O' and swings the hook L', and the pin 62 passes into the second recess in the head $O^2$, so that $O^2$ and H will be steadied in their relation to each other as the rack-plate H and parts connected with it are lowered to pick up the cable, the hook L', being thus retained in its swung-back position until it is swung under the cable by the first lifting movement of D acting on the heads $O^2$ and rods O', and the pin 62 passes again into the lowest recess in O², and the movements before described take place.

Figure 7:
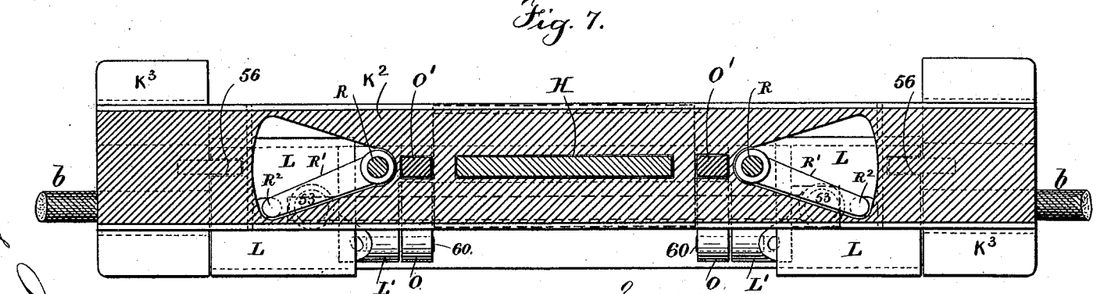
Fig. 7 is a sectional plan view near the line $y\,y$ of Fig. 3.

In the top piece K² of the grip-frame there are vertical holes for the reception of the vertical shafts R, and on the under sides of the top piece K² are recesses for the cranks R', (see Figs. 7, 10, and the dotted lines in Fig. 3,) and at the swinging ends of these cranks R' are vertical pins R², passing down into elongated holes in the grip-block L, and the upper ends of the vertical shafts R pass up through the projections at the ends of the box C and terminate in crank-arms S, having links S', to the crank-arms S² upon the shaft T, that passes longitudinally through the upper part of the box C, and the ends of this shaft T are preferably squared for the reception of a lever-handle that is to be placed upon such shaft for giving motion to the same at the proper time, or a rod with a hook may be hooked upon the end T' of one crank-arm S², so as to move such crank-arm and turn the shaft T and simultaneously the crank-arm at the other end of the shaft T, and by the links S' and crank-arms S the vertical shafts R are simultaneously turned in either one direction or the other, and the cranks R' are swung from the position represented in Fig. 7 to the opposite position, or vice versa, and in so doing the grip-block L and the parts connected with it are bodily moved from one side of the grip-frame to the other, and I prefer to make use of center-pins 80 upon the ends of the grip-block L, passing up into recesses upon the under side of the top piece K² of the grip-frame to steady the grip-block when fully raised against K².

In changing the grip from one cable to the other the handle G is acted upon to move the rod D² endwise toward the box C, and in so doing the crank D' is swung and the pivots 10 and cross-heads D are lowered, and the rack-plate H and all the parts connected with the cross-head are lowered, and the pin 32 is lowered along with the rack-plate H, and the springs 53, expanding, keep the grip-block l up toward the top piece K² of the grip-frame, and after the pawl 40 has taken the first tooth in the rack-plate H the further downward movement of the cross-head D and vertical rods O' causes the hook-swingers O to throw the grip-hook L' out from beneath the cable that had been gripped. After this has been done the top of the grip-block L may be at some little distance below the lower edge of the top piece K² of the grip-frame; but the parts are not to be lowered sufficiently for the flanges 56 of the grip-frame to come in contact with the central blocks 55 at the ends of the grip-block. Hence the grip-block and the parts that are carried by it can at this time be swung bodily and with facility from the position shown by full lines in Fig. 10 to the position shown in Fig. 2 and by dotted lines in Fig. 10, or the reverse, it being understood that both cables at this time are dropped, and in swinging the grip-block and parts connected therewith bodily, the pins 60 slide in the slots of the hook-swingers O and the pin 32 is moved bodily and laterally in the slot of the head H', and upon reference to Fig. 2 it will be seen that after the parts have been lowered sufficiently for the grip-hook L to pass beneath the cable a the direction in which the hook L swings is not in any way changed, and that the hook L catches the cable a in the same direction and in the same manner as it catches the cable b; but when the parts are raised into the position shown in Fig. 2 the cable a comes at the opposite sides of the end pieces K³ of the grip-frame to those with which the cable b is brought into contact, as shown in Figs. 9 and 10.

Figure 3:
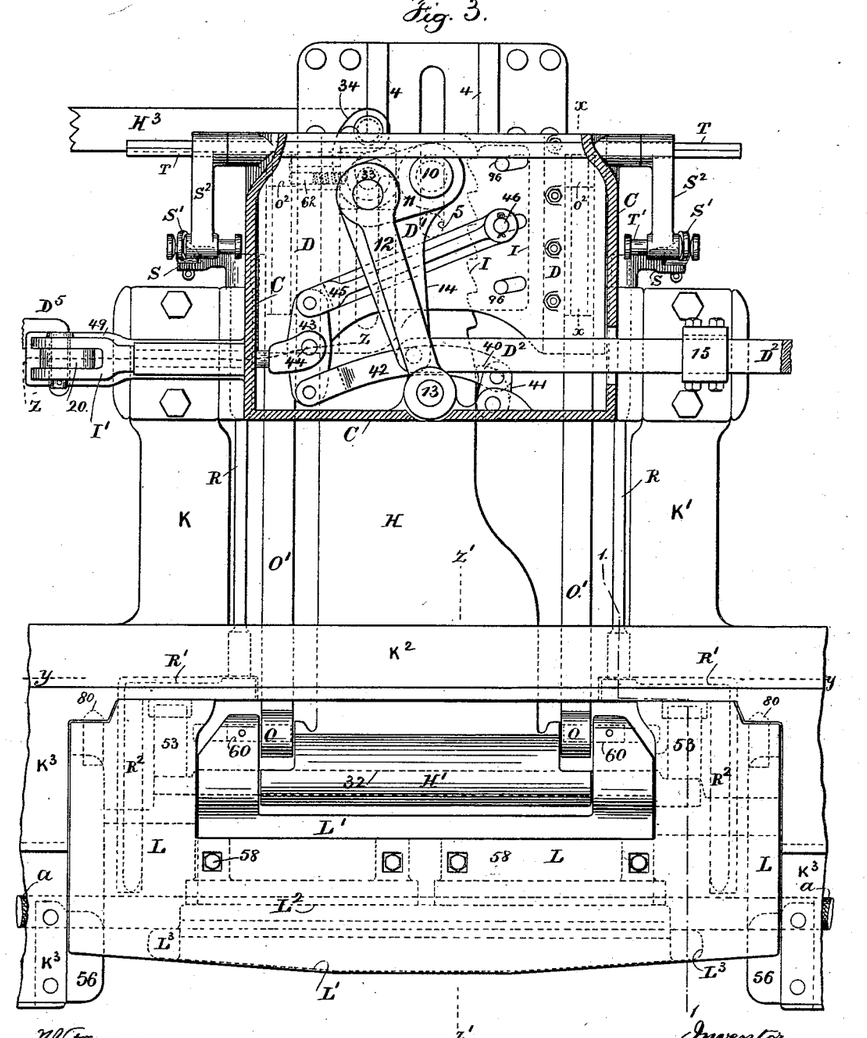
Fig. 3 is an elevation of the grip mechanism with part of the frame-work in section.
Figure 4:
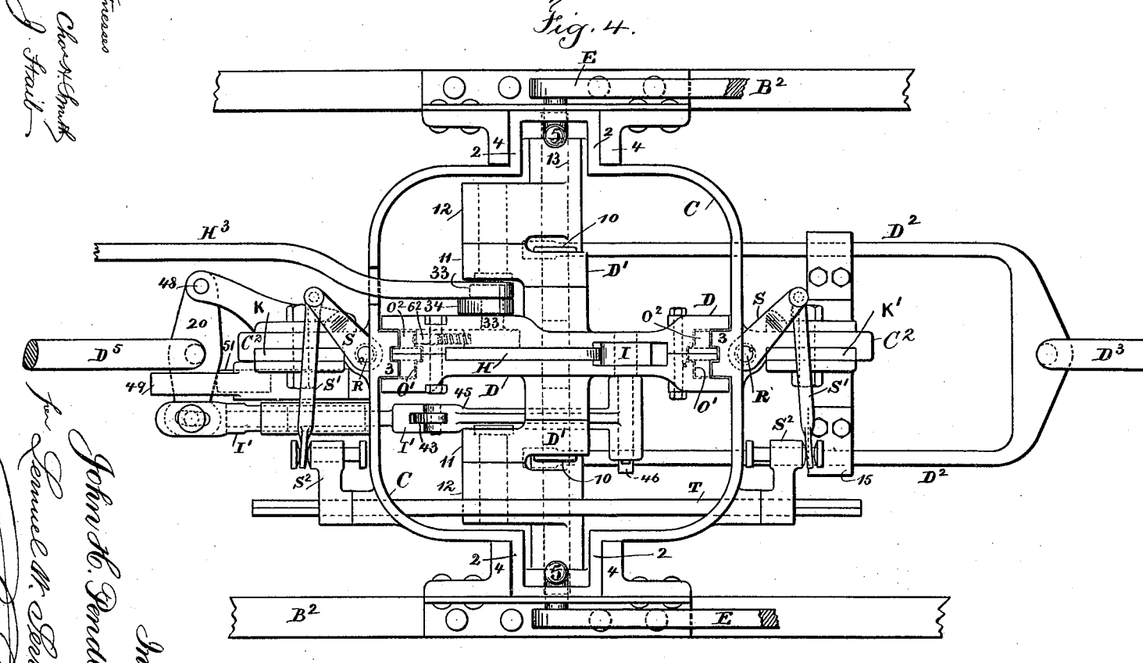
Fig. 4 is a plan view of the parts below the car-body.

In order to steady the grip-hook L', there are end pieces L³ to such grip-hook, as seen in Figs. 2 and 10 and by dotted lines in Fig. 3. These end pieces L³ are raised up into the notched lower edge of the grip-block L before the cable is clamped, so that the cable can run along upon the surface of the grip-hook without any risk of swinging the grip-hook out of its position, and the amount of motion allowed to the pin 32 at its end slotted bearings in the grip-block L (see Figs. 9 and 10) is sufficient for the grip-hook to be lowered bodily along with the rack-plate H and its slotted head for the ends L³ of the hooks to be free from the grip-block before the grip-hook is swung by the action of the rods O' and hook-swingers O, as before stated, and I remark that when one grip is changed from one cable to the other the car will always be at rest and the attendants can turn the shaft T by the proper lever or by a hook, as before described, applied from one side of and below the car or by raising up a trap in the floor of the car, as may be most convenient.

Figure 11:
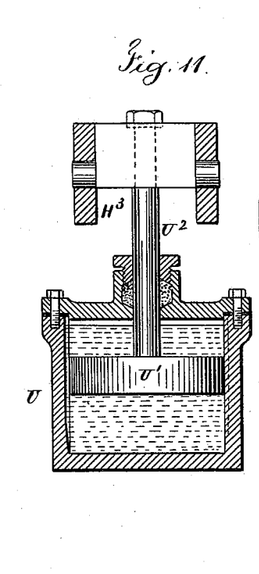
Fig. 11 is a section of the dash-pot and lever connected therewith.

The dash-pot U (seen in Figs. 5 and 11) is of any usual form and contains oil or other liquid, and the piston U' of the dash-pot is connected by the rod U² with the lever H³, the object of this dash-pot being to prevent the rack-plate H and parts connected with the same from falling too rapidly when the pawl 40 and clutch-plate I are pressed back out of contact with the rack-plate H, as before described.

It will be understood that by unhooking the box C from the hooks 5 and disconnecting the hook 34 from the pin 33 and by unhooking the ends of the rods D³ and D⁵ from the yoke D² and lever 20, respectively, the entire grip mechanism can be separated from the car for repairs or otherwise and another grip mechanism can be substituted.

I claim as my invention—

1. The combination, with a trench-inclosure, two cables, and their supporting-wheels within the trench, of a single grip mechanism adapted to grasp one cable, a grip-frame adapted to hold the grip mechanism, and connections passing up between the slot-rails from the grip-frame to the car, and means for moving the grip mechanism bodily within the trench and from the line of one cable to the line of the other cable, so that either cable may be gripped with the same mechanism, substantially as set forth.

2. The combination, with the car and its wheels and axles, of a frame carried by the axles, a box sliding vertically within guides in the frame, a grip mechanism within the road-bed trench, connections from the grip mechanism passing up through the slot of the trench to the vertically-moving box, and the counterpoise-levers E and springs 6, adapted to permit the box, the grip, and the connections to rise and fall, substantially as set forth.

3. The combination, with a car and its wheels and axles, of a frame supported by the axles, a vertically-moving box sliding within the frame, a counterpoise acting upon the said box and parts connected with it, a grip mechanism within the trench, a permanent connection between the box and the grip-frame within the trench, a separate sliding mechanism for acting upon the grip, and a separate counterpoise-lever $H^3$, connected with the same, whereby the grip mechanism as a whole can rise and fall and the separately-sliding mechanism operating upon the grip is counterpoised, substantially as set forth.

4. The combination, with the grip-frame, of the grip-block L, having edge flanges 54, central blocks 55, the flanges 56 upon the grip-frame, the grip-hook L' within the grip-block, the pin 32, for connecting the grip-hook and grip-block, and the plate H and mechanism for acting upon the same to raise and lower the grip-hook and cause it to grip or release the cable, substantially as set forth.

5. The combination, with the grip-frame, of the grip-block L and the grip-hook L', pivoted within the same and having projecting ends $L^3$ passing into the notched lower edge of the grip-block, substantially as set forth.

6. The grip-block L, slotted in its lower edge and provided with the grip-jaws $L^2$, in combination with the grip-hook L', the pin 32, connecting the grip-hook to the grip-block, and the springs 53, acting upon the ends of the pin 32 in releasing the pressure of the grip-hook upon the cable, substantially as set forth.

7. The grip-block L, grooved on its under edge, in combination with the grip-hook L', pivoted at 32 to the grip-block, the grip-frame within which the grip-block is received, and mechanism, substantially as specified, for moving the grip-block laterally within the grip-frame, so that one of two cables may be gripped at one side or the other of the lower portion of the grip-frame, substantially as set forth.

8. The combination, with the grip-block A, of the grip-hook pivoted upon the grip-block, the grip-frame receiving and supporting the grip-block, the rack-plate H and its head H', for acting upon the pivot of the grip-hook, and the hook-swingers O and their rods O', for acting upon the grip-hook to swing the same, substantially as set forth.

9. The combination, with the box C, of the cross-head D, sliding within the same, the rack-plate H, passing vertically through the cross-head, the pawl and clutch for holding and moving the rack-plate, the compound cranks D' and radius-bars 12, pivoted upon the cross-head and box, respectively, and the rod $D^2$, for giving motion to the crank and raising and lowering the cross-head and parts connected therewith, substantially as set forth.

10. The box or support C and the cross-head D, sliding vertically within the same, in combination with the compound cranks D' and radius-bars 12, pivoted, respectively, to the box C and cross-head D, the rods $D^2$, for giving motion to the compound cranks and to the devices connected with the cross-head, and the grip-hook and grip-frame acted upon by the cross-head and parts connected therewith as they are moved vertically, substantially as set forth.

11. The combination, with the grip-block and grip-hook, of a cross-head and connections between the cross-head and the grip-block and grip-hook, the compound cranks for moving the cross-head vertically, the pawl and clutch and the links and connections for acting upon the same, and a lever upon the car and connections for giving motion to the compound cranks, the pawl, and the clutch, substantially as set forth.

12. The combination, with a grip mechanism, of the movable frame $F^2$, adapted to be held in position at either end of the car, the lever G upon such movable frame, the rockers F, links 21, rods $D^3$ $D^4$ $D^5$, levers 16 and 17, and the grip-moving mechanism acted upon by the respective rods, the rocker which is not in use being held in position at one end of the car while the lever and rocker at the other end of the car are brought into action, whereby the grip mechanism can be operated from either end of the car, substantially as set forth.

13. The combination, with the grip mechanism, of the box C, cross-head D, and the rack-plate H, moving vertically within the same, the compound cranks D' and radius-bars 12 and rods $D^2$, for giving motion to the cross-head, the pawl 40, clutch I, and the links 42 and 45, the lever 43, slide-rod I' and spring 47, for acting upon the pawl and clutch, respectively, and the rod $D^5$, lever 20, and spring 50, for giving motion to the slide-rod I', substantially as set forth.

14. The combination, with the grip-block and grip-hook, of the grip-frame, the connections from the frame passing up to the car, the plate H, rods O', and mechanism for giving a vertical movement to such parts in raising and lowering the grip and grip-block and in swinging the grip, and the vertical shafts R and cranks R', for moving the grip-block bodily and transversely, and the cranks and connections for giving to the vertical shafts R a partial rotation, substantially as set forth.

15. The combination, with the rack-plate H and its head H', of the grip-block and grip-hook, the pawls and moving cross-head and parts connected therewith for raising and lowering the rack-plate H, the hook-swingers O and vertical rod O', passing up into the cross-head and acted upon by the same, the grip-frame for receiving and holding the grip-block, and the shafts R, cranks R', and mechanism for giving a partial rotation to the shafts R to swing the grip-block bodily and laterally within the grip-frame, substantially as set forth.

Signed by me this 5th day of February, 1890.

J. H. PENDLETON.

Witnesses:
  GEO. T. PINCKNEY,
  WILLIAM G. MOTT.